United States Patent
Nagata et al.

(10) Patent No.: US 11,698,632 B2
(45) Date of Patent: Jul. 11, 2023

(54) PRODUCTION SYSTEM, DATA TRANSMISSION METHOD, AND INFORMATION STORAGE MEDIUM

(71) Applicant: Kabushiki Kaisha Yaskawa Denki, Kitakyushu (JP)

(72) Inventors: Takeshi Nagata, Kitakyushu (JP); Takahiko Suzuki, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 112 days.

(21) Appl. No.: 17/210,453

(22) Filed: Mar. 23, 2021

(65) Prior Publication Data

US 2021/0302951 A1 Sep. 30, 2021

(30) Foreign Application Priority Data

Mar. 26, 2020 (JP) ................................ 2020-056225

(51) Int. Cl.
*G05B 23/02* (2006.01)
*G05B 19/418* (2006.01)
*G06F 13/10* (2006.01)

(52) U.S. Cl.
CPC ..... *G05B 23/0264* (2013.01); *G05B 19/4183* (2013.01); *G05B 19/4185* (2013.01); *G05B 19/41835* (2013.01); *G06F 13/10* (2013.01)

(58) Field of Classification Search
CPC ............ G05B 23/0264; G05B 19/4183; G05B 19/41835; G05B 19/0423; G05B 2219/31094; G06F 13/10
See application file for complete search history.

(56) References Cited

U.S. PATENT DOCUMENTS

2003/0163652 A1* 8/2003 Tsuge .................... G06F 3/0643
711/147
2004/0170138 A1* 9/2004 Blevins .............. G05B 19/0423
370/328
(Continued)

FOREIGN PATENT DOCUMENTS

CN 109696878 A 4/2019
JP H04138373 A 5/1992
(Continued)

OTHER PUBLICATIONS

Office Action dated Jun. 29, 2021, for corresponding JP Patent Application No. 2020-056225 with Partial English translation pp. 1-4.
(Continued)

*Primary Examiner* — Tuan C Dao
(74) *Attorney, Agent, or Firm* — Hea Law PLLC

(57) ABSTRACT

Provided is a production system including: a first industrial machine configured to control a second industrial machine; and circuitry configured to acquire data relating to an operation of at least one of the first industrial machine or the second industrial machine, wherein the first industrial machine comprises a synchronous area regularly subjected to synchronization and an asynchronous area different from the synchronous area, and wherein the first industrial machine is configured to: write the data into the asynchronous area; and transmit the data written in the asynchronous area to an external device.

19 Claims, 9 Drawing Sheets

(56) References Cited

U.S. PATENT DOCUMENTS

| | | | | |
|---|---|---|---|---|
| 2005/0021657 | A1* | 1/2005 | Negishi | H04L 9/40 709/213 |
| 2006/0072695 | A1* | 4/2006 | Iwamura | H04N 21/4305 375/354 |
| 2006/0203804 | A1* | 9/2006 | Whitmore | H04L 12/5692 370/352 |
| 2007/0073986 | A1* | 3/2007 | Ninose | G06F 11/2058 711/162 |
| 2007/0118840 | A1* | 5/2007 | Amaki | G06F 3/0613 718/105 |
| 2007/0222581 | A1* | 9/2007 | Hawkins | G07F 17/0014 340/539.1 |
| 2007/0250672 | A1* | 10/2007 | Stroberger | G06F 11/2064 711/162 |
| 2012/0246511 | A1* | 9/2012 | Sato | G06F 11/2094 714/6.2 |
| 2015/0074472 | A1* | 3/2015 | Boger | G06F 11/0787 714/57 |
| 2016/0238659 | A1 | 8/2016 | Shiromoto et al. | |
| 2017/0308319 | A1* | 10/2017 | Suzuki | G06F 12/16 |
| 2017/0336766 | A1 | 11/2017 | Nakagawa et al. | |
| 2018/0209183 | A1* | 7/2018 | Ham | G07C 9/00 |
| 2018/0292793 | A1* | 10/2018 | Bliss | G05B 19/409 |
| 2019/0095106 | A1* | 3/2019 | Li | G06F 3/0653 |
| 2019/0246353 | A1* | 8/2019 | Jensen | H04L 67/12 |

FOREIGN PATENT DOCUMENTS

| | | |
|---|---|---|
| JP | 2017079006 A | 4/2017 |
| JP | 6626313 B2 | 12/2019 |
| WO | 2015068210 A1 | 5/2015 |
| WO | 2016079771 A1 | 5/2016 |

OTHER PUBLICATIONS

Search Report dated Jul. 15, 2021, for corresponding EP Patent Application No. 21163318.5 pp. 1-10.

Office Action dated Feb. 8, 2022, for corresponding JP Patent Application No. 2020-056225 with partial English translation, pp. 1-3.

Office Action dated Feb. 22, 2023, for corresponding EP Patent Application No. 21163318.5, pp. 1-5.

* cited by examiner

FIG.4

| CHANNEL | DATA |
|---|---|
| CHANNEL 1 | COLLECTION TARGET DATA A |
| CHANNEL 2 | COLLECTION TARGET DATA B |
| CHANNEL 3 | COLLECTION TARGET DATA C |
| CHANNEL 4 | — |
| CHANNEL 5 | — |
| ⋮ | ⋮ |

PRODUCTION SYSTEM, DATA TRANSMISSION METHOD, AND INFORMATION STORAGE MEDIUM

CROSS-REFERENCE TO RELATED APPLICATION

The present disclosure contains subject matter related to that disclosed in Japanese Priority Patent Application JP 2020-056225 filed in the Japan Patent Office on Mar. 26, 2020, the entire contents of which are hereby incorporated by reference.

BACKGROUND OF THE INVENTION

1. Field of the Invention

The embodiments disclosed herein relate to a production system, a data transmission method, and an information storage medium.

2. Description of the Related Art

In WO 2015/068210 A1, there is described a system in which an industrial machine configured to control another industrial machine acquires collection target data relating to an operation of the another industrial machine and transmits the collection target data to a higher-level device that is communicatively connected to the industrial machine.

SUMMARY OF THE INVENTION

According to one aspect of the present disclosure, there is provided a production system including: a first industrial machine configured to control a second industrial machine; and circuitry configured to acquire data relating to an operation of at least one of the first industrial machine or the second industrial machine, wherein the first industrial machine comprises a synchronous area regularly subjected to synchronization and an asynchronous area different from the synchronous area, and wherein the first industrial machine is configured to: write the data into the asynchronous area; and transmit the data written in the asynchronous area to an external device.

BRIEF DESCRIPTION OF THE DRAWINGS

FIG. 4 is a table for showing an example of data stored in a synchronous area.

DESCRIPTION OF THE EMBODIMENTS

1. Overall Configuration of Production System

When data is collected by performing polling between an external device and an industrial machine, it is required to regularly monitor a synchronous area, and hence a processing load on the industrial machine and the external device may increase. As a result of extensive research and development for reducing the processing load on each of the industrial machine and the external device, the inventors have conceived of a novel and original production system and the like. A detailed description is now given of the production system and the like according to a first embodiment of the present disclosure.

Figure 1:
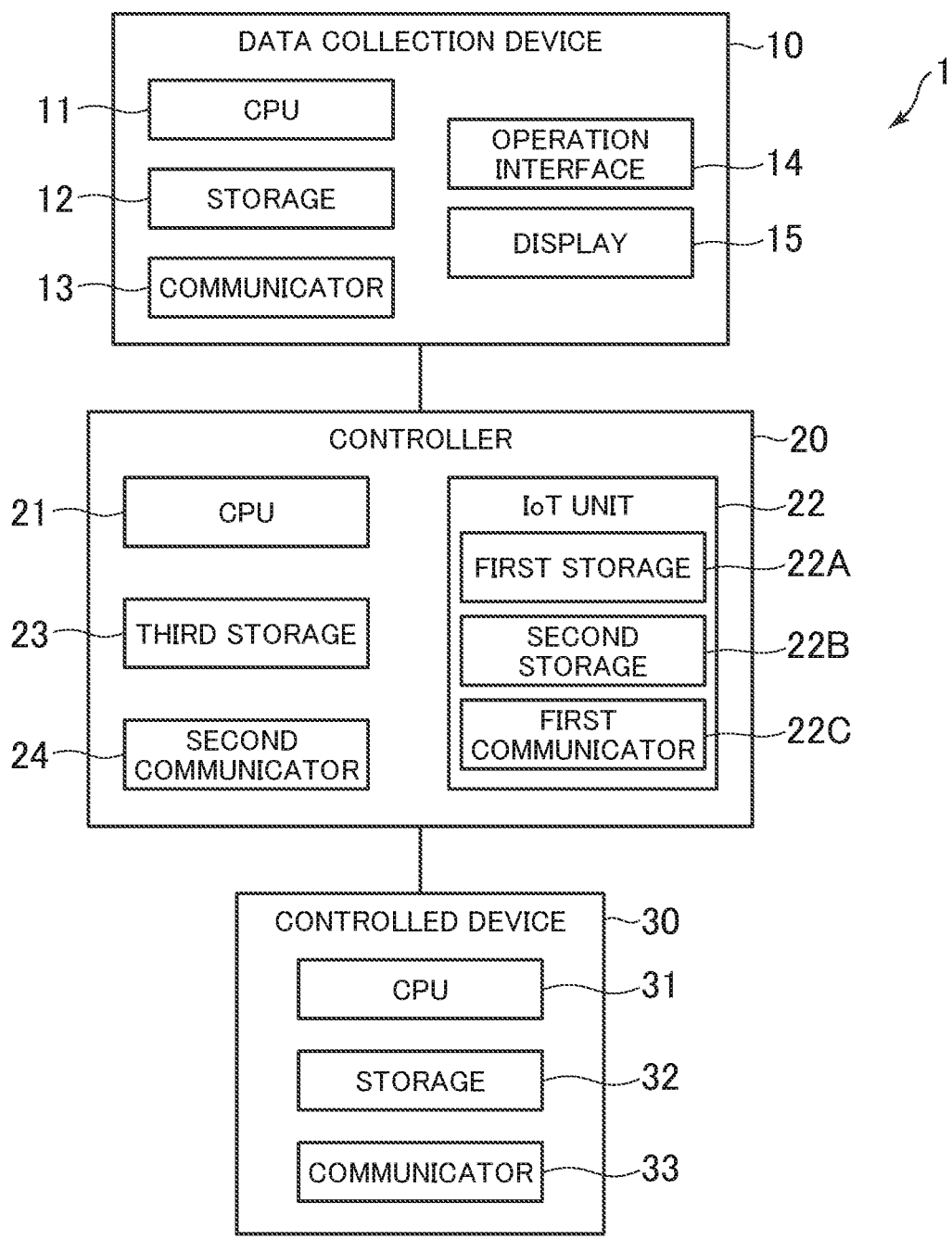
FIG. 1 is a diagram for illustrating an example of an overall configuration of a production system according to an embodiment of the present disclosure.

FIG. 1 is a diagram for illustrating an example of an overall configuration of the production system. As illustrated in FIG. 1, a production system 1 includes a data collection device 10, a controller 20, and a controlled device 30. In the first embodiment, the data collection device 10 and the controller 20 are connected to each other through a general network, for example, an Ethernet (trademark). The controller 20 and the controlled device 30 are connected to each other through a network for industrial machines. The network for connecting machines to each other is not limited to the example of the first embodiment, and the controller 20 and the controlled device 30 can be connected through any network.

The data collection device 10 is an example of an external device. Accordingly, the term "data collection device 10" as used in the first embodiment can be read as "external device." The external device is a device different from an industrial machine described later. The external device is communicatively connected to the industrial machine through the network. For example, the external device is configured to collect data relating to the operation of the industrial machine. In addition, for example, the external device is configured to analyze the operation of the industrial machine and provide feedback of an analysis result to the industrial machine.

For example, the data collection device 10 is a personal computer, a server computer, a cellular phone (including a smartphone), or a mobile terminal (including a tablet terminal). The data collection device 10 may be a kind of the industrial machines. The data collection device 10 includes a CPU 11, a storage 12, a communicator 13, an operation interface 14, and a display 15.

The CPU 11 includes at least one processor. The storage 12 includes a RAM or a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is an example of the industrial machine (the first industrial machine). Accordingly, the term "controller 20" as used in the first embodiment can be read as "industrial machine (the first industrial machine)." The industrial machine is a collective term for machines configured to assist or substitute human work and peripheral machines thereof. For example, in addition to the controller 20, the controlled device 30 also corresponds to the industrial machine. For example, a programmable logic controller (PLC), a robot controller, an industrial robot, a motor controller, a servo amplifier, an inverter, a converter, a machine tool, a conveyance device, or a semiconductor manufacturing apparatus corresponds to the industrial machine. The controller 20 is configured to control at least one controlled device 30. The production system 1 may be referred to as "cell," which is a unit smaller than a line. In this case, the controller 20 may be referred to as "cell controller."

The controller 20 includes a CPU 21, an Internet-of-Things (IoT) unit 22, a third storage 23, and a second communicator 24. The physical configuration of each of the CPU 21, the third storage 23, and the second communicator 24 may be the same as that of the CPU 11, the storage 12, and the communicator 13, respectively. The CPU 21 may include at least one of a volatile memory or a nonvolatile memory. For example, the CPU 21 may include a memory called "cache memory." The CPU 21 stores a variable described later.

The CPU 21 is an example of a first control circuit. Accordingly, the CPU 21 as used in the first embodiment can be read as "first control circuit." The first control circuit is configured to control another industrial machine described later. The first control circuit is not limited to a general-purpose processor, and may be any circuit. For example, the first control circuit may be a circuit called "FPGA" or "ASIC." The first control circuit is a kind of circuitry.

The IoT unit 22 is an example of a second control circuit. Accordingly, the IoT unit 22 as used in the first embodiment can be read as "second control circuit." The second control circuit is a circuit configured to transmit data to the external device. The second control circuit is not limited to the circuit used for IoT, and may be any circuit. For example, the second control circuit may be a circuit called "FPGA" or "ASIC." For example, the second control circuit may be a general-purpose processor. The second control circuit is a kind of circuitry.

The IoT unit 22 is configured to transmit data to another computer through the network. For example, the IoT unit 22 includes a first storage 22A, a second storage 22B, and a first communicator 22C. The first storage 22A and the second storage 22B may each be the same as the storage 12. The first communicator 22C may be the same as the communicator 13. For example, the first communicator 22C is mainly used for communication to/from the data collection device 10, and the second communicator 24 is mainly used for controlling the controlled device 30. The IoT unit 22 may include another configuration, for example, a CPU. When the CPU 21 is provided with a data collection function, the IoT unit 22 may be omitted.

The controlled device 30 is an example of another industrial machine (the second industrial machine). Accordingly, the controlled device 30 as used in the first embodiment can be read as "another industrial machine (the second industrial machine)." The term "industrial machine" has such a meaning as described above. The another industrial machine may be any kind of industrial machine described above. In the first embodiment, another industrial machine is controlled by the controller 20. It suffices that another industrial machine is an industrial machine different from the controller 20.

The controlled device 30 includes a CPU 31, a storage 32, and a communicator 33. The physical configuration of each of the CPU 31, the storage 32, and the communicator 33 may be the same as that of each of the CPU 11, the storage 12, and the communicator 13, respectively. The controlled device 30 may also include other physical components. For example, the controlled device 30 may include a circuit referred to as "FPGA" or "ASIC." Further, for example, a machine to be controlled, such as a motor or the like, a sensor for detecting an operation of a motor, a camera for photographing a state of a workpiece to be processed, an input/output device, or another industrial machine may be connected to the controlled device 30. The number of controlled devices 30 to be controlled by the controller 20 may be any number. For example, the controller 20 may control only one device, or may control two or more devices.

The programs and data described as being stored in each of the data collection device 10, the controller 20, and the controlled device 30 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. Outline of Production System

In the first embodiment, the controller 20 is configured to control the controlled device 30 based on each of the plurality of variables. The variable is referred to by a control program for controlling the controlled device 30. The control program may also rewrite the variable. For example, the variable indicates a result of unfinished calculation or a physical quantity detected by a sensor (for example, a torque value detected by a torque sensor or a rotation speed of a motor detected by a motor encoder). The variable may be a value relating to an operation of the controlled device 30, and may be a value of, for example, a position or a moving speed of a robot arm, a speed of the motor, or a waiting time for waiting for the operation.

For example, when the controlled device 30 executes a plurality of processes in a predetermined order, an execution order of the processes is described in the control program. The controller 20 sends an instruction to the controlled device 30 based on the control program. The variable may be used as an execution condition of the process. For example, the controlled device 30 stores a variable for starting the process, a variable for suspending the process, or a variable for ending the process. The variable may be referred to as "input/output variable." The controller 20 may control the controlled device 30 without particularly using variables.

The "process" is a task or an operation to be performed by the controlled device 30. The process may be composed of only one task, or may be composed of a combination of a plurality of tasks. The process may have any content in accordance with the use of the controlled device 30. For example, the process is recognition of a workpiece, gripping of a workpiece, opening/closing of a door, setting of a workpiece, or machining using a machine tool. The controlled device 30 performs at least one process. The number of processes to be performed by the controlled device 30 may be any number. The controlled device 30 may perform only one process, or may perform a plurality of processes. The controlled device 30 performs the process based on the instruction received from the controller 20 and a device program stored in the controlled device 30 itself.

The device program is a program defining an operation of the controlled device 30. In the device program, each procedure of each process is defined. The device program can be created in any language in accordance with the controlled device 30, and is created through use of, for example, a ladder language or a robot language. In the first embodiment, a device program is prepared for each process. Accordingly, when a certain controlled device 30 is to perform "n" processes ("n" is a natural number), the controlled device 30 stores at least "n" device programs.

In the first embodiment, data relating to the operation of at least one of the controller 20 or the controlled device is collected by the control program. The data is hereinafter referred to as "collection target data." The collection target data may be data relating to the operation of both the controller 20 and the controlled device 30, or may be data relating to the operation of any one thereof. In the first embodiment, a case in which the collection target data is data relating to the operation of the controlled device 30 is described.

For example, the collection target data is generated based on a detection signal from a sensor for detecting the operation of the controlled device 30. The collection target data includes a physical quantity detected by a sensor. The collection target data may indicate an operation at only one time point, or may indicate operations at a plurality of time points in chronological order. The collection target data may have any contents, and examples thereof include a torque value detected by the torque sensor, a speed and a position of the motor detected by the motor encoder, a position and a posture of the robot arm detected by a motion sensor or a gyro sensor, and a temperature detected by a temperature sensor. The collection target data may be internal information of the controlled device 30, and examples thereof may include the load on the CPU 31, the consumption amount of the storage 32, and the communication amount of the communicator 33. The collection target data may indicate a calculation result when the CPU 31 performs a predetermined calculation, or may indicate an intermediate result thereof.

In the first embodiment, at least one piece of collection target data is collected by at least one application included in the control program. The control program may include a plurality of applications, and the collection target data to be collected by the applications may be different among the applications. The application itself may be referred to as "control program." The application may be provided separately from the control program.

The application can collect the collection target data from the controlled device 30 by any method. For example, so-called message communication (non-fixed-cycle communication or asynchronous communication) may be used, or a file transfer protocol (FTP) or the like may be used. When there are a plurality of controlled devices 30, the communication method for transmitting the collection target data may be different between one controlled device 30 and another controlled device 30. In the first embodiment, the application is described as being created by the same user as a user of the control program, but may be created by a user different from the user of the control program.

Figure 2:
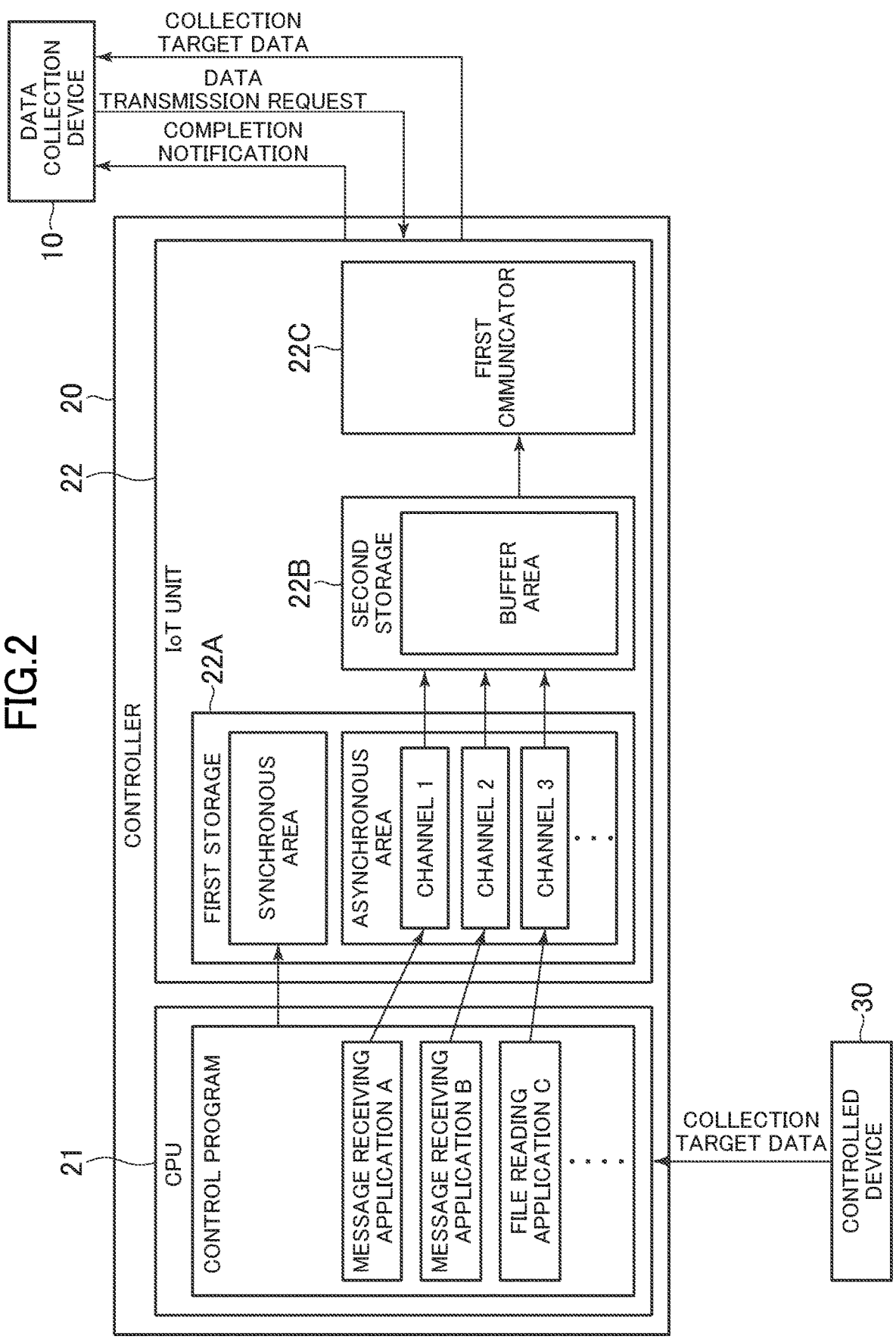
FIG. 2 is a diagram for illustrating a flow of processing for collecting collection target data.

FIG. 2 is a diagram for illustrating a flow of processing for collecting the collection target data. As illustrated in FIG. 2, the control program includes a plurality of applications. In the example of FIG. 2, the control program includes three applications, namely, a message receiving application A, a message receiving application B, and a file reading application C. Those applications are hereinafter referred to simply as "applications" unless specifically distinguished.

For example, the message receiving application A is an application for collecting first collection target data (for example, a torque value) through use of the message communication. The message receiving application B is an application for collecting second collection target data (for example, a speed of the motor) through use of message communication. The file reading application C is an application for collecting third collection target data (for example, a posture of the robot arm) through use of the FTP.

In the first embodiment, the data collection device 10 selects the collection target data, and performs a data collection setting on each of the controller 20 and the controlled device 30. For example, as the data collection setting, a type of the collection target data and a collection condition for the collection target data are set. Examples of the collection condition may be a trigger for starting the collection of the collection target data, a sampling period, a scale of the data, and a period for collecting the collection target data. Each of the controller 20 and the controlled device 30 collects the collection target data based on the data collection setting.

For example, the CPU 21 executes the control program to transmit a command for control to the controlled device 30. The command for control is a command for controlling the operation of the controlled device 30, and includes, for example, output to a motor, a position and a speed of the robot arm, and other information. In the first embodiment, the controlled device 30 operates based on the command for control, and simultaneously during the operation, generates collection target data to transmit the collection target data to the controller 20. The collection target data may be generated and transmitted by other methods in the same manner as in a second embodiment of the present disclosure and a third embodiment of the present disclosure which are described later.

When the CPU 21 receives the collection target data from the controlled device 30, the CPU 21 transfers the received collection target data to the IoT unit 22. The collection target data may be transferred to the IoT unit 22 after being accumulated in, for example, the storage included in the CPU 21 or the third storage 23, or may be transferred to the IoT unit 22 without particularly being accumulated in any one of those storages. The IoT unit 22 records the transferred collection target data in the first storage 22A.

In the first embodiment, the first storage 22A is divided into a synchronous area and an asynchronous area. That is, the controller 20 includes the synchronous area regularly subjected to synchronization and the asynchronous area different from the synchronous area. The synchronous area is an area in which synchronization is performed between the CPU 21 and the IoT unit 22. The synchronization as used herein is to regularly (periodically) perform the matching of the data. The synchronization is to cause any one of the value stored in the CPU 21 and the value stored in the synchronous area of the IoT unit 22 to agree with the other (to copy one value to the other).

For example, changing the value stored in the CPU 21 to the value stored in the synchronous area of the IoT unit 22 for a given variable corresponds to the synchronization. Further, for example, changing the value stored in the synchronous area of the IoT unit 22 to the value stored in the CPU 21 for a given variable corresponds to the synchronization. The synchronization may be executed mainly by the CPU 21 or may be executed mainly by the IoT unit 22. The CPU 21 or the IoT unit 22 is subjected to the synchronization for each given fixed cycle period.

In the first embodiment, variables stored in the synchronous area are regularly transmitted to the data collection device 10. For example, polling is performed between the data collection device 10 and the IoT unit 22, and the data collection device 10 regularly collects the variables stored in the synchronous area. The data collection device 10 may collect all the variables, but in the first embodiment, it is assumed that only a part of variables are collected. For example, when a user of the data collection device 10 and a user of the controller 20 are different from each other, a part or all of the variables allowed to be disclosed to the user of the data collection device 10 are collected by the data collection device 10.

The asynchronous area is an area that is not a synchronous area. The asynchronous area is an area that is not subjected to the synchronization between the CPU 21 and the IoT unit 22. However, the asynchronous area may have data synchronized irregularly (non-periodically). For example, the CPU 21 transfers collection target data collected from the controlled device 30 to the IoT unit 22, and writes the collection target data into the asynchronous area of the first storage 22A.

In the first embodiment, the asynchronous area is divided into a plurality of channels. The channel is a storage area provided in an asynchronous area. The channel may be formed of serial addresses, or may be formed of non-serial discontinuous addresses. The number of channels provided in the asynchronous area may be freely set, and for example, about several channels may be provided, or ten or more channels may be provided. The channel to be used by each application may be fixed, but in the first embodiment, each application can use any channel.

For example, when all the channels in the asynchronous area are free, the channels are used in order of addresses. In the example of FIG. 2, when the message receiving application A first receives the collection target data, the CPU 21 writes the collection target data into the first channel 1. When the message receiving application B secondly receives the collection target data, the CPU 21 writes the collection target data into the second channel 2. When the file reading application C thirdly receives the collection target data, the CPU 21 writes the collection target data into the third channel 3.

The IoT unit 22 writes the collection target data written in each channel of the asynchronous area into the second storage 22B. The second storage 22B may also be divided into a plurality of channels. In the first embodiment, the second storage 22B includes at least one buffer area, and the collection target data is written into the buffer area. When the writing of the collection target data into the buffer area is completed, the IoT unit 22 transmits a completion notification indicating that the writing of the collection target data is completed to the data collection device 10. When the data collection device 10 receives the completion notification, the data collection device 10 requests the IoT unit 22 for the collection target data that has been written. The IoT unit 22 transmits the collection target data to the data collection device 10 in response to the request from the data collection device 10.

As described above, the production system 1 writes the collection target data into the asynchronous area instead of the synchronous area regularly subjected to the synchronization, and transmits the collection target data to the data collection device 10, to thereby, for example, eliminate the requirement for the polling between the data collection device 10 and the controller 20, and reduce the processing load at the time of the data collection. This configuration is described below in detail.

3. Functions to be Implemented in Production System

Figure 3:
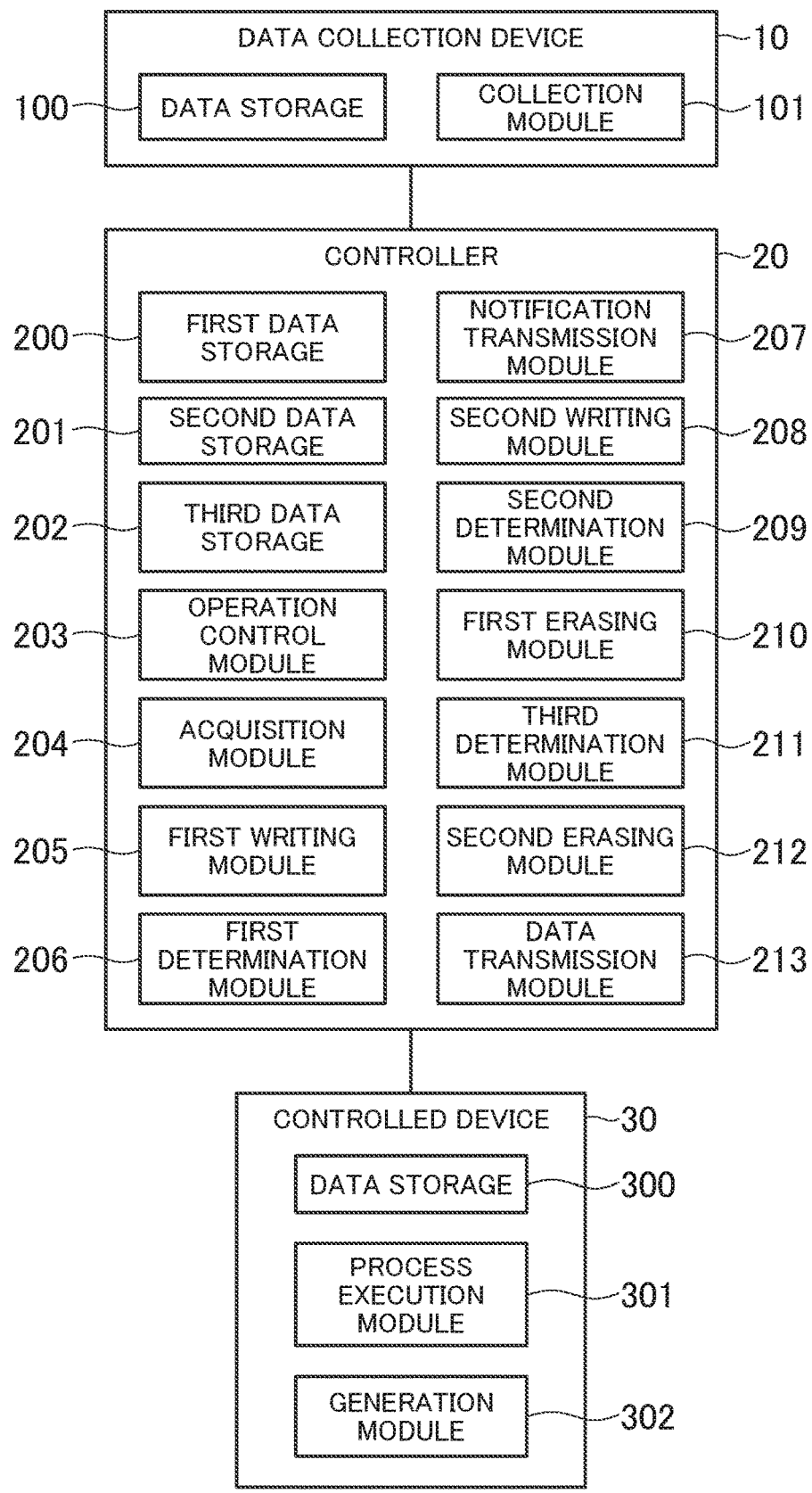
FIG. 3 is a functional block diagram for illustrating functions to be implemented in the production system.

FIG. 3 is a functional block diagram for illustrating functions to be implemented in the production system 1. In the first embodiment, functions to be implemented in each of the data collection device 10, the controller 20, and the controlled device 30 are described.

[3-1. Functions to be Implemented by Data Collection Device]

As illustrated in FIG. 3, the data collection device 10 includes a data storage 100 and a collection module 101.

[Data Storage]

The data storage 100 is mainly implemented by the storage 12. The data storage 100 is configured to store data relating to data collection. For example, the data storage 100 stores variable data which stores variables collected from the synchronous area of the controller 20. The variable data is regularly collected. The variable data may store the value of a variable at a certain time point, or may store a chronological change of the value of the variable. In addition, the variable data may store only the value of one variable, or may store the values of a plurality of variables. In another example, the variable data may store values calculated based on the values of a plurality of variables. In the first embodiment, the variables included in the variable data are recorded in the synchronous area of the first storage 22A.

Further, for example, the data storage 100 stores the collection target data collected from the asynchronous area of the controller 20. The collection target data is data collected irregularly. Further, for example, the data storage 100 stores an application for analyzing the operation of the controller 20 or the controlled device 30. For example, this application handles the variable data or the collection target data as input, and handles the analysis result as output. In the application, a relationship between the variable data or the collection target data and the analysis result is defined. Feedback may be provided to the controller 20 based on the analysis result.

[Collection Module]

The collection module 101 is mainly implemented by the CPU 11. The collection module 101 is configured to collect the collection target data from the controller 20. The collection as used herein has the same meaning as that of reception or acquisition. In the first embodiment, the collection module 101 transmits a predetermined request to the controller 20 when the collection module 101 receives the completion notification transmitted by a notification transmission module 207 described later. This request is a request for transmission of the collection target data, and is issued by transmitting data having a predetermined format. This request is hereinafter referred to as "data transmission request." The data transmission request may include information for identifying the collection target data to be transmitted.

The collection module 101 determines whether or not the completion notification has been received from the controller 20. When the collection module 101 determines that the completion notification has been received, the collection module 101 transmits the data transmission request to the controller 20. The collection module 101 transmits the data transmission request to the controller 20 in response to the reception of the completion notification (on condition that the completion notification has been received). The collection target data is transmitted by a data transmission module 213 described later, and the collection module 101 collects the transmitted collection target data.

The controller 20 may spontaneously transmit the collection target data to the data collection device 10. In this case, the collection module 101 receives the collection target data spontaneously transmitted by the controller 20. In another example, the collection module 101 may inquire the controller 20 about whether or not there is collection target data in the buffer area when the analysis result of the variable data is fed back. In this case, the controller 20 may refer to the buffer area in response to the inquiry to transmit the collection target data to the data collection device 10.

[3-2. Functions to be Implemented by Controller]

As illustrated in FIG. 3, in the controller 20, a first data storage 200, a second data storage 201, a third data storage 202, an operation control module 203, an acquisition module 204, a first writing module 205, a first determination module 206, the notification transmission module 207, a second writing module 208, a second determination module 209, a first erasing module 210, a third determination module 211, a second erasing module 212, and the data transmission module 213 are implemented.

[First Data Storage]

The first data storage 200 is mainly implemented by the first storage 22A. The first data storage 200 is configured to store data to be collected by the data collection device 10. In the first embodiment, the first data storage 200 has a synchronous area and an asynchronous area. That is, the first data storage 200 is divided into a synchronous area and an asynchronous area. The synchronous area is an area in a first address region, and the asynchronous area is an area in a second address region. The first data storage 200 may have a plurality of synchronous areas. The first data storage 200 may have a plurality of asynchronous areas. Each of the synchronous area and the asynchronous area is a storage area in a predetermined address range.

For example, the first data storage 200 is configured to store a current value of each of a plurality of variables in the synchronous area. The current value of the variable stored in the first data storage 200 and the current value of the variable stored in the third data storage 202 are matched with each other. As described above, the matching of those values is regularly performed. It suffices that data to be synchronized is stored in the synchronous area, and data other than variables may be stored therein. It suffices that the synchronous area stores data to be synchronized.

FIG. 4 is a table for showing an example of the data stored in the asynchronous area. As shown in FIG. 4, the first data storage 200 stores at least one piece of collection target data in the asynchronous area. In the first embodiment, the asynchronous area is divided into a plurality of channels, and, for example, at least one piece of collection target data is stored in each individual channel. When the collection target data has a large size, the collection target data may be divided to be stored in a plurality of channels. When the collection target data has a small size, a plurality of pieces of collection target data may be stored in one channel.

The channel is a storage area in a fixed address range provided in the asynchronous area. The channel is an example of the small area included in the asynchronous area. Accordingly, the channel as used in the first embodiment can be read as "small area." It suffices that the small area is a fixed storage area, and the small area may be referred to as any name other than "channel." The small area may be associated with the application for collecting the collection target data, or may not particularly be associated with the application. That is, the small area may be an area dedicated to a specific application or an area shared by a plurality of applications.

[Second Data Storage]

The second data storage 201 is mainly implemented by the second storage 22B. The second data storage 201 is configured to store the collection target data transferred from the first data storage 200. In the first embodiment, the second data storage 201 has a buffer area. The buffer area is an area for temporarily storing the collection target data to be transmitted to the data collection device 10. The buffer area can also be said to be an area to be referred to by the data collection device 10. The second data storage 201 may have a plurality of buffer areas. The buffer area is a storage area in a predetermined address range.

In the first embodiment, a case in which the first data storage 200 has the synchronous area and the asynchronous area and the second data storage 201 has the buffer area is described. However, the synchronous area, the asynchronous area, and the buffer area may be present in one storage (physically one piece of hardware). In this case, the IoT unit 22 may include only one storage in place of the plurality of storages. Further, for example, the synchronous area and the asynchronous area may be present in separate storages. Further, for example, the synchronous area and the buffer area may be present in one storage while the asynchronous area may be present in another storage. Further, for example, the asynchronous area and the buffer area may be present in one storage while the synchronous area may be present in another storage.

The second data storage 201 may store all the pieces of collection target data stored in the first data storage 200, or may store only a part of the collection target data. For example, when the second data storage 201 has a memory capacity larger than that of the asynchronous area of the first data storage 200, the second data storage 201 may store all the pieces of collection target data stored in the asynchronous area of the first data storage 200. Meanwhile, for example, when the second data storage 201 has a memory capacity smaller than that of the asynchronous area of the first data storage 200, the second data storage 201 may store a part of the collection target data stored in the asynchronous area of the first data storage 200.

[Third Data Storage]

The third data storage 202 is mainly implemented by at least one of the storage in the CPU 21 or the third storage 23. The third data storage 202 is configured to store data required for controlling the controlled device 30. For example, the third data storage 202 stores the current value of each of the plurality of variables. The third data storage 202 stores the current value of each variable. Each variable is stored in a specific register. It is assumed that a relationship between each variable and each register (which variable is stored in which register) is specified in advance by, for example, a creator of the control program. The variables stored in the register can be referred to as appropriate by another device.

Further, for example, the third data storage 202 stores a control program (including the application for collecting the collection target data) and parameters. In addition, for example, the third data storage 202 may store another program, for example, firmware, or may store a program for transmitting variable data to the data collection device 10. Further, for example, the third data storage 202 may store a variable definition indicating a definition of the variables disclosed to the user of the data collection device 10. All or a part of the variables indicated in the variable definition are subjected to the data collection. In addition, for example, the third data storage 202 stores a setting for the collection target data.

The data stored in the controller 20 is not limited to the above-mentioned example. For example, the controller 20 may store data for defining a register corresponding to each variable. Further, for example, the controller 20 may store information enabling identification of the controlled device 30 to be controlled by the controller 20 itself. Further, for example, the controller 20 may store information enabling identification of the data collection device 10. Those pieces of data may be stored in any one of the first data storage 200, the second data storage 201, and the third data storage 202.

[Operation Control Module]

The operation control module 203 is mainly implemented by the CPU 21. The operation control module 203 is configured to control the operation of the controlled device 30 based on the control program. For example, the operation control module 203 sends a command to the controlled device 30, and the controlled device 30 operates based on the command. In the first embodiment, the collection target data is collected in response to the command for control, and hence this command can also be said to be a command for collecting the collection target data. The operation control module 203 periodically updates each of the plurality of variables to control the controlled device 30. For example, when the controlled device 30 operates based on the value of the variables associated with the device program, the operation control module 203 sends, to the controlled device 30, an instruction to change the value of the variable for starting the device program. The controlled device 30 executes the device program by changing the value of the variable based on the instruction. When the variable is not particularly used for controlling the operation of the controlled device 30, the operation control module 203 may control the operation of the controlled device 30 by transmitting a command indicating the operation to be executed by the controlled device 30.

[Acquisition Module]

The acquisition module 204 is mainly implemented by the CPU 21. The acquisition module 204 is configured to acquire collection target data relating to the operation of at least one of the controller 20 or the controlled device 30. In the first embodiment, the collection target data is generated by a generation module 302 described later, and hence the acquisition module 204 acquires the collection target data generated by the generation module 302. For example, the acquisition module 204 acquires the collection target data based on the application for collecting the collection target data.

[First Writing Module]

The first writing module 205 is mainly implemented by the CPU 21. The first writing module 205 is configured to write the collection target data into an asynchronous area, which is one of a synchronous area regularly subjected to synchronization and the asynchronous area different from the synchronous area. The writing as used herein has the same meaning as that of storing, recording, or transferring. This point is the same for the writing performed by the second writing module 208 described later.

The first writing module 205 writes the collection target data acquired by the acquisition module 204 into the asynchronous area. The collection target data may be written into the asynchronous area after being temporarily written into the storage area of, for example, the third data storage 202, or may be written into the asynchronous area immediately after the collection target data is acquired without such temporary writing. In the first embodiment, the controller 20 includes a first control circuit (the CPU 21) and a second control circuit (the IoT unit 22), and hence the first writing module 205 of the first control circuit writes the collection target data into the asynchronous area of the second control circuit.

In the first embodiment, the asynchronous area has a plurality of channels, and hence the first writing module 205 selects at least one usable channel from the plurality of channels to write the collection target data. The usable channel is a channel into which the collection target data can be written. For example, a channel storing no collection target data, a channel having an unused capacity larger than the size of the collection target data, or a channel storing the collection target data that has been transmitted to the data collection device 10 is the usable channel.

For example, the first writing module 205 inquires the IoT unit 22 about whether or not there is a usable channel. The inquiry to be made may include a storage size (data size of the collection target data) to be used for writing the collection target data. When the IoT unit 22 receives the inquiry, the IoT unit 22 refers to the asynchronous area of the second storage 22B to determine whether or not there is a usable channel. At that time, the IoT unit 22 may determine whether or not there is a channel having a storage size equal to or larger than the storage size included in the inquiry.

The IoT unit 22 transmits the determination result to the first writing module 205. When there are usable channels, the determination result may indicate a part or all of the usable channels. The first writing module 205 selects any channel indicated in the determination result. The channel can be selected by any method, for example, the channel having the lowest-numbered address may be selected, or the channel may be randomly selected. The first writing module 205 requests the IoT unit 22 to write the collection target data into the selected channel.

[First Determination Module]

The first determination module 206 is mainly implemented by the IoT unit 22. The first determination module 206 is configured to determine whether or not the writing of the collection target data is completed. The first determination module 206 can determine whether or not the writing of the collection target data into a freely-selected storage is completed. In the first embodiment, a case in which the first determination module 206 determines whether or not the writing of the collection target data into the buffer area of the second data storage 201 is completed is described. However, when the buffer area is not particularly provided, the first determination module 206 may determine whether or not the writing of the collection target data into the asynchronous area of the first data storage 200 is completed. The first determination module 206 determines whether or not the writing of up to the last data section of the collection target data is completed.

[Notification Transmission Module]

The notification transmission module 207 is mainly implemented by the IoT unit 22. The notification transmission module 207 is configured to transmit a predetermined completion notification to the data collection device 10 when the first determination module 206 determines that the writing of the collection target data is completed. The notification transmission module 207 transmits the predetermined completion notification to the data collection device 10 in response to the determination by the first determination module 206 that the writing of the collection target data is completed (on condition that it is determined that the writing is completed). It suffices that the completion notification has a predetermined format, and may include, for example, the type of collection target data, an address in the buffer area at which the collection target data is stored, and other information.

[Second Writing Module]

The second writing module 208 is mainly implemented by the IoT unit 22. The second writing module 208 is configured to write the collection target data written in the asynchronous area into a buffer area different from the synchronous area and the asynchronous area. The second writing module 208 may start to write the collection target data into the buffer area when the writing of the collection target data into the asynchronous area is completed, or may start to write the collection target data into the buffer area during the writing of the collection target data into the asynchronous area.

The second writing module 208 may determine whether or not the buffer area is usable. For example, no collection target data being written in the buffer area, the buffer area having an unused capacity equal to or larger the size of the collection target data, or the buffer area storing only the transmitted collection target data corresponds to the buffer area being usable. When it is determined that the buffer area is usable, the second writing module 208 writes the collection target data in the asynchronous area into the buffer area. When it is not determined that the buffer area is usable, the second writing module 208 waits to write the collection target data from the asynchronous area into the buffer area until it is determined that the buffer area is usable.

[Second Determination Module]

The second determination module 209 is mainly implemented by the IoT unit 22. The second determination module 209 is configured to determine whether or not the writing of the collection target data from the asynchronous area into the buffer area is completed. The second determination module 209 determines whether or not the writing of the collection target data up to the last data section of the collection target data which has been written into the asynchronous area into the buffer area is completed.

[First Erasing Module]

The first erasing module 210 is mainly implemented by the IoT unit 22. The first erasing module 210 is configured to erase the collection target data written in the asynchronous area when it is determined that the writing of the data from the asynchronous area into the buffer area is completed. The first erasing module 210 erases the collection target data written in the asynchronous area in response to the determination that the writing of the collection target data from the asynchronous area into the buffer area is completed (on condition that it is determined that the writing is completed).

[Third Determination Module]

The third determination module 211 is mainly implemented by the CPU 21. The third determination module 211 is configured to determine whether or not the transmission of the collection target data to the data collection device 10 is completed. The third determination module 211 determines whether or not the transmission of the collection target data up to the last data section of the collection target data which has been written into the buffer area to the data collection device 10 is completed.

[Second Erasing Module]

The second erasing module 212 is mainly implemented by the CPU 21. The second erasing module 212 is configured to erase the collection target data written in the buffer area when it is determined that the transmission of the collection target data to the data collection device 10 is completed. The second erasing module 212 erases the collection target data written in the buffer area in response to the determination that the transmission of the collection target data to the data collection device 10 is completed (on condition that it is determined that the transmission is completed).

[Data Transmission Module]

The data transmission module 213 is mainly implemented by the IoT unit 22. The data transmission module 213 is configured to transmit the collection target data written in the asynchronous area to the data collection device 10. In the first embodiment, the data collection device 10 transmits a predetermined request to the controller 20 when the data collection device 10 receives the completion notification, and the data transmission module 213 transmits the data to the external device when the data transmission module 213 receives the request. The data transmission module 213 transmits the collection target data written in the asynchronous area in response to the reception of the request (on condition that the request has been received).

In the first embodiment, the collection target data is written into the channel of the asynchronous area, and hence the data transmission module 213 transmits the collection target data written in at least one channel to the data collection device 10. When no channel is particularly provided, the data transmission module 213 transmits the collection target data in the asynchronous area irrespective of the channel.

Further, in the first embodiment, the collection target data is written into the buffer area, and hence the data transmission module 213 transmits the data written in the buffer area to the data collection device 10. When any buffer area is not particularly provided, the data transmission module 213 directly transmits the collection target data in the asynchronous area.

[3-3. Functions to be Implemented by Controlled Device]

As illustrated in FIG. 3, in the controlled device 30, a data storage 300, a process execution module 301, and the generation module 302 are implemented.

[Data Storage]

The data storage 300 is mainly implemented by the storage 32. The data storage 300 is configured to store the data required for the controlled device 30 to execute a process. For example, the data storage 300 stores the device program and current values of the variables. The current values of the variables stored in the data storage 300 is regularly matched with the current values of the variables stored in the first data storage 200. The value of each variable is stored in a predetermined register. In addition, for example, the data storage 300 stores the setting for the collection target data.

[Process Execution Module]

The process execution module 301 is mainly implemented by the CPU 31. The process execution module 301 is configured to execute a predetermined process based on the device program stored in the data storage 300 and an instruction received from the controller 20. For example, when the controller 20 is to start a certain device program, the controller 20 transmits to the controlled device 30 an instruction to set a variable associated with the device program to a predetermined value. When the controlled device 30 receives the instruction, the controlled device 30 changes the variable to a predetermined value. When the process execution module 301 detects that the variable has been changed to the predetermined value, the process execution module 301 executes the device program associated with the variable.

When the process indicated by the device program ends, the process execution module 301 changes the variable associated with the device program to a predetermined value, and transmits the fact to the controller 20. Then, when executing another device program, the controller 20 transmits to the controlled device 30 an instruction to set the variable associated with the another device program to a predetermined value, and the process execution module 301 executes the another device program. When the execution order of a plurality of device programs is defined in the controlled device 30, it is not required to transmit the end of the device program to the controller 20, and the process execution module 301 may execute the plurality of device programs one after another.

[Generation Module]

The generation module 302 is mainly implemented by the CPU 31. The generation module 302 is configured to generate collection target data. For example, the generation module 302 generates collection target data based on variables stored in the data storage 300, a detection signal from the sensor connected to the controlled device 30, or internal information of the controlled device 30. In the first embodiment, the data collection device 10 performs a setting for the collection target data, and hence the generation module 302 generates the collection target data based on this setting. For example, the generation module 302 determines whether or not a set collection condition is satisfied. When the generation module 302 determines that the collection condition is satisfied, the generation module 302 generates collection target data of the type included in the command.

4. Processing to be Executed in Production System

Figure 5:
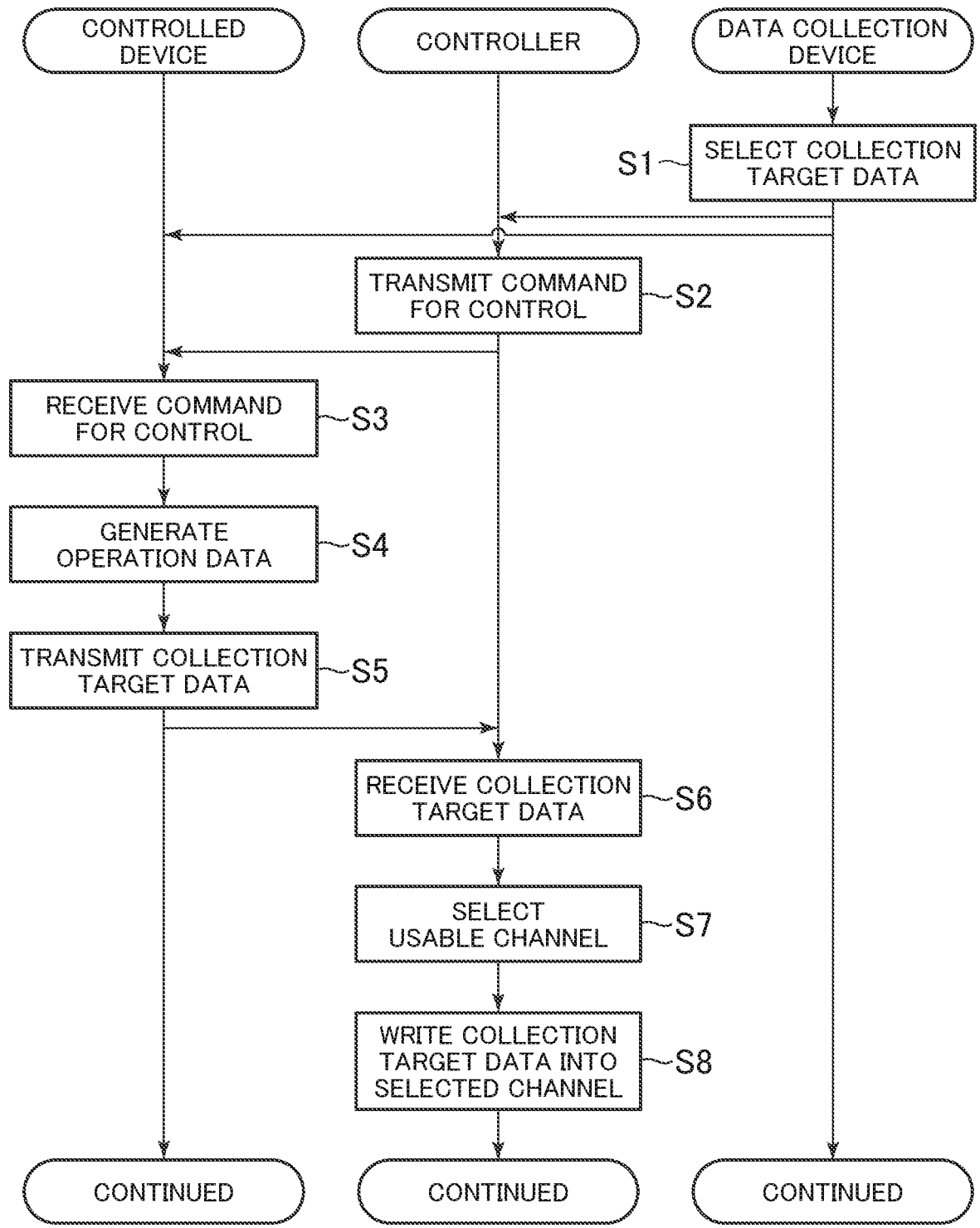
FIG. 5 is a flowchart for illustrating an example of processing to be executed in a production system according to a first embodiment of the present disclosure.
Figure 6:
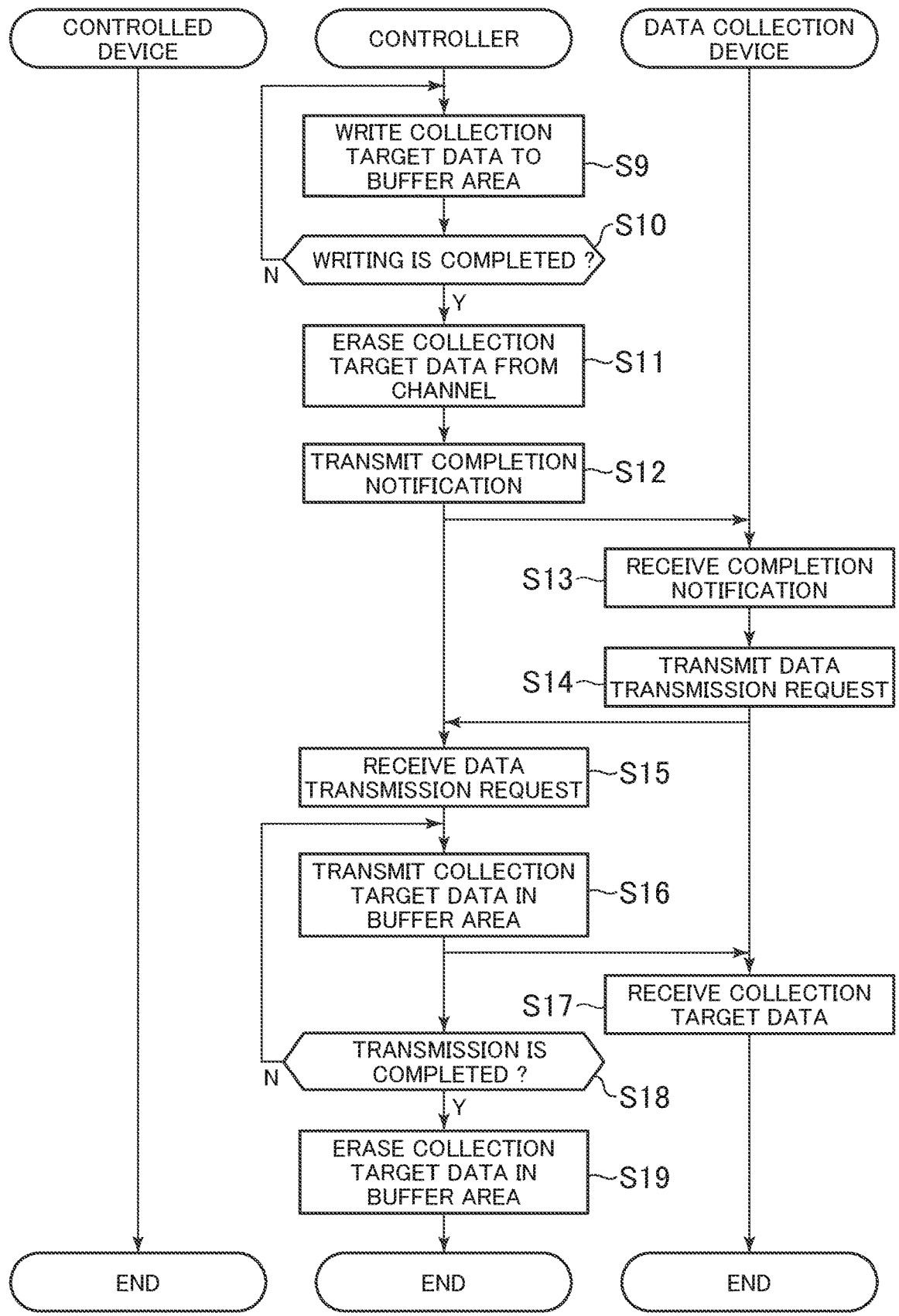
FIG. 6 is a flowchart for illustrating an example of processing to be executed in the production system according to the first embodiment.

FIG. 5 and FIG. 6 are each a flowchart for illustrating an example of processing to be executed in the production system 1 according to the first embodiment. The processing illustrated in FIG. 5 and FIG. 6 is an example of the processing to be executed by the functional blocks illustrated in FIG. 3.

As illustrated in FIG. 5, the data collection device 10 selects the collection target data to perform a setting for the collection target data on each of the controller 20 and the controlled device 30 (Step S1). For example, setting contents are specified by the user of the data collection device 10. The data collection device 10 transmits the setting contents specified by the user to each of the controller 20 and the controlled device 30. Each of the controller 20 and the controlled device 30 receives and stores the setting contents of the collection target data. The controlled device 30 may receive the setting contents via the controller 20, or may be directly and communicatively connected to the data collection device 10.

The CPU 21 of the controller 20 transmits a command for control to the controlled device 30 (Step S2). In Step S2, the CPU 21 executes the control program to generate and transmit a command for control including the contents of the operation of the controlled device 30. When the controlled device 30 receives the command for control (Step S3), the controlled device 30 operates based on the command to generate operation data (Step S4). The operation data is included in the collection target data. For example, the operation data may indicate information other than the contents specified as collection targets. The operation data may indicate a response to the command for control (a response to be transmitted every cycle period).

In Step S4, the collection target data may be generated as well. For example, the controlled device 30 determines whether or not the collection condition is satisfied based on the variables stored in the storage 32. The collection condition is not required to be a condition relating to the variables, and the determination may be performed based on, for example, the physical quantity detected by the sensor connected to the controlled device 30, the calculation result of the CPU 31, or the presence or absence of an alarm. When the collection condition is satisfied, the controlled device 30 generates the collection target data selected by the data collection device 10 based on, for example, the variables or the detection signal from the sensor.

The controlled device 30 transmits the collection target data to the controller 20 (Step S5). The collection target data transmitted in Step S5 includes the operation data. When a transmission method for the collection target data is specified in advance, the controlled device 30 transmits the collection target data generated in Step S4 by the specified transmission method. When a plurality of transmission methods are not provided and only a single transmission method is used, the transmission method may not be specified.

When the controller 20 receives the collection target data (Step S6), the CPU 21 selects a usable channel from a plurality of channels in the asynchronous area (Step S7). In Step S7, the CPU 21 inquires the IoT unit 22 about whether or not there are usable channels. The IoT unit 22 refers to the asynchronous area of the first storage 22A to determine whether or not there are usable channels. The IoT unit 22 transmits the determination result to the CPU 21. The CPU 21 receives the determination result. When the determination result indicates that there are usable channels, the CPU 21 selects at least one of the usable channels as the usable channel. When the determination result indicates that there are no usable channels, the CPU 21 temporarily writes the collection target data into the third storage 23, and waits until a usable channel is provided.

The CPU 21 writes the collection target data into the channel selected in Step S7 (Step S8). In Step S8, the CPU 21 specifies the channel selected in Step S4 to request the IoT unit 22 to write the collection target data. When the IoT unit 22 receives the request, the IoT unit 22 writes the collection target data into the channel specified by the CPU 21.

Referring next to FIG. 6, when the collection target data is written into the selected channel, the IoT unit 22 writes the collection target data into the buffer area of the second storage 22B (Step S9). The IoT unit 22 determines whether or not the writing of the collection target data from the selected channel into the buffer area is completed (Step S10). When it is not determined that the writing of the collection target data is completed (N in Step S10), the processing returns to the processing of Step S9 to continue the writing of the collection target data. Meanwhile, when it is determined that the writing of the collection target data is completed (Y in Step S10), the IoT unit 22 erases the collection target data from the channel into which the writing of the collection target data is completed (Step S11), and transmits the completion notification to the data collection device 10 (Step S12). Any one of the processing of Step S11 and the processing of Step S12 may be executed first.

When the data collection device 10 receives the completion notification (Step S13), the data collection device 10 transmits a data transmission request to the controller 20 (Step S14). When the IoT unit 22 of the controller 20 receives the data transmission request (Step S15), the IoT unit 22 transmits the collection target data written in the buffer area to the controller 20 (Step S16). The data collection device 10 receives the collection target data, and records the collection target data in the storage 12 (Step S17).

The IoT unit 22 determines whether or not the transmission of the collection target data written in the buffer area is completed (Step S18). When it is not determined that the transmission of the collection target data is completed (N in Step S18), the processing returns to the processing of Step S16 to continue the transmission of the collection target data. Meanwhile, when it is determined that the transmission of the collection target data is completed (Y in Step S18), the IoT unit 22 erases the transmitted collection target data written in the buffer area (Step S19), and this processing ends.

With the production system 1 described above, data is transmitted to the data collection device 10 after being written into the asynchronous area of the first storage 22A including the synchronous area regularly subjected to the synchronization and the asynchronous area different from the synchronous area, to thereby eliminate the requirement for the polling between the data collection device 10 and the controller 20. As a result, it is possible to reduce the processing load on each of the data collection device 10 and the controller 20.

The production system 1 also transmits a notification to the data collection device 10 when the writing of the collection target data is completed, and transmits the data written in the asynchronous area when the controller 20 receives a request from the external device, to thereby eliminate the requirement for the polling between the data collection device 10 and the controller 20. As a result, it is possible to reduce the processing load on each of the data collection device 10 and the controller 20.

Further, the production system 1 is provided separately with the CPU 21 being the first control circuit for controlling the controlled device 30 and the IoT unit 22 being the second control circuit for transmitting data to the data collection device 10, to thereby distribute the processing load. Accordingly, it is possible to prevent problems from occurring in the control of the controlled device 30 and the data transmission. As a result, accuracy of the control can be improved, and the collection target data can be transmitted quickly and accurately.

Further, in the production system 1, the asynchronous area is divided into a plurality of channels. The production system 1 writes the collection target data into at least one channel, and transmits the collection target data written in the at least one channel to the data collection device 10, to thereby be able to prevent other pieces of collection target data from being unable to be transmitted until the transmission of a given piece of collection target data is completed. As a result, the asynchronous area can be effectively utilized, and the collection target data can be efficiently transmitted.

Further, the production system 1 writes the collection target data written in the asynchronous area into the buffer area, and transmits the collection target data written in the buffer area to the data collection device 10. This enables, for example, the asynchronous area to be utilized for other purposes after the collection target data is written into the buffer area, to thereby be able to effectively utilize the asynchronous area.

Further, the production system 1 erases the collection target data written in the asynchronous area when it is determined that the writing of the collection target data from the asynchronous area into the buffer area is completed, to thereby be able to reduce a memory consumption amount and effectively utilize the asynchronous area.

Further, the production system 1 erases the data written in the buffer area when it is determined that the transmission of the data to the data collection device 10 is completed, to thereby be able to reduce the memory consumption amount and effectively utilize the buffer area.

5. Second Embodiment

In the first embodiment, the case in which the controlled device 30 operates in accordance with the command received from the controller 20 and transmits the collection target data generated during the operation has been described. The controlled device 30 may generate and transmit the collection target data based on its own setting irrespective of the command received from the controller 20. Now, the production system 1 according to the second embodiment is described. In the second embodiment, an overall configuration and functional blocks of the production system 1 are the same as those in the first embodiment. In the second embodiment, a processing flow described with reference to FIG. 5 and FIG. 6 is different from that in the first embodiment.

Figure 7:
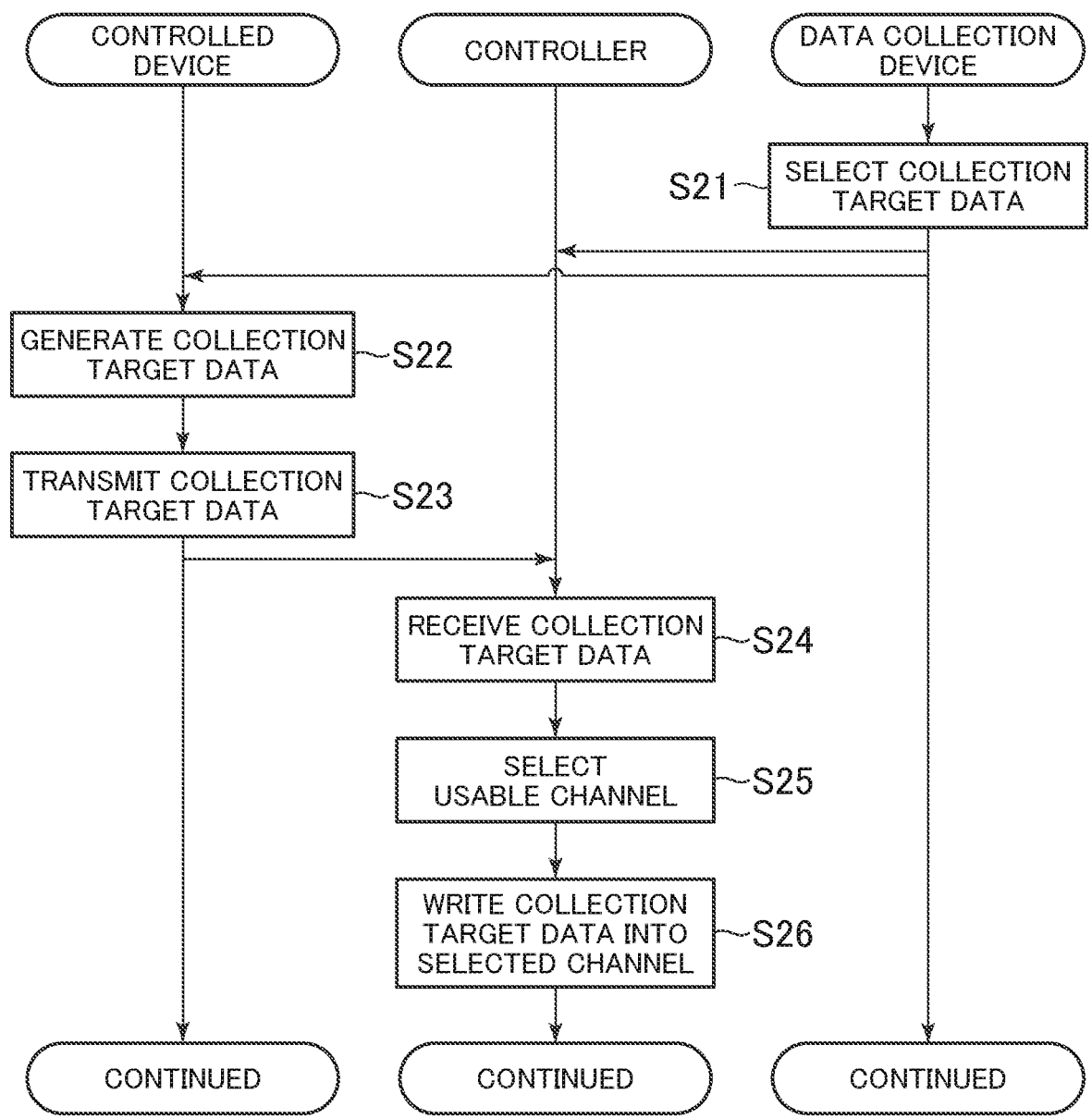
FIG. 7 is a flowchart for illustrating an example of processing to be executed in a production system according to a second embodiment of the present disclosure.

FIG. 7 is a flowchart for illustrating an example of processing to be executed in the production system 1 according to the second embodiment. In the second embodiment as well, a command for control is transmitted from the controller 20 to the controlled device 30, but is omitted in FIG. 7. As illustrated in FIG. 7, the processing of Step S21 is the same as the processing of Step S1. The controlled device 30 generates collection target data based on the setting from the data collection device 10 (Step S22), and transmits the collection target data to the controller 20 (Step S23).

In Step S22, the controlled device 30 determines whether or not the collection condition is satisfied irrespective of the command for control (without the command for control). The controlled device 30 generates collection target data when it is determined that the collection conditions is satisfied. The controlled device 30 transmits the collection target data separately from the response to a command for control. In the second embodiment as well, the collection target data may include operation data. The following processing from Step S24 to Step S26 is the same as the processing from Step S6 to Step S8. After Step S26, the same processing as the processing of Step S9 and the subsequent steps is executed.

According to the second embodiment, the controlled device 30 is enabled to generate collection target data without a command for control from the controller 20.

6. Third Embodiment

In the second embodiment, the case in which the controlled device 30 spontaneously transmits the collection target data has been described, but the controlled device 30 may be configured to store the collection target data, and the controller 20 may be configured to acquire the collection target data stored in the controlled device 30. That is, the collection target data stored in the controlled device 30 may be read out at a timing of the controller 20. Now, the production system 1 according to the third embodiment is described.

Figure 8:
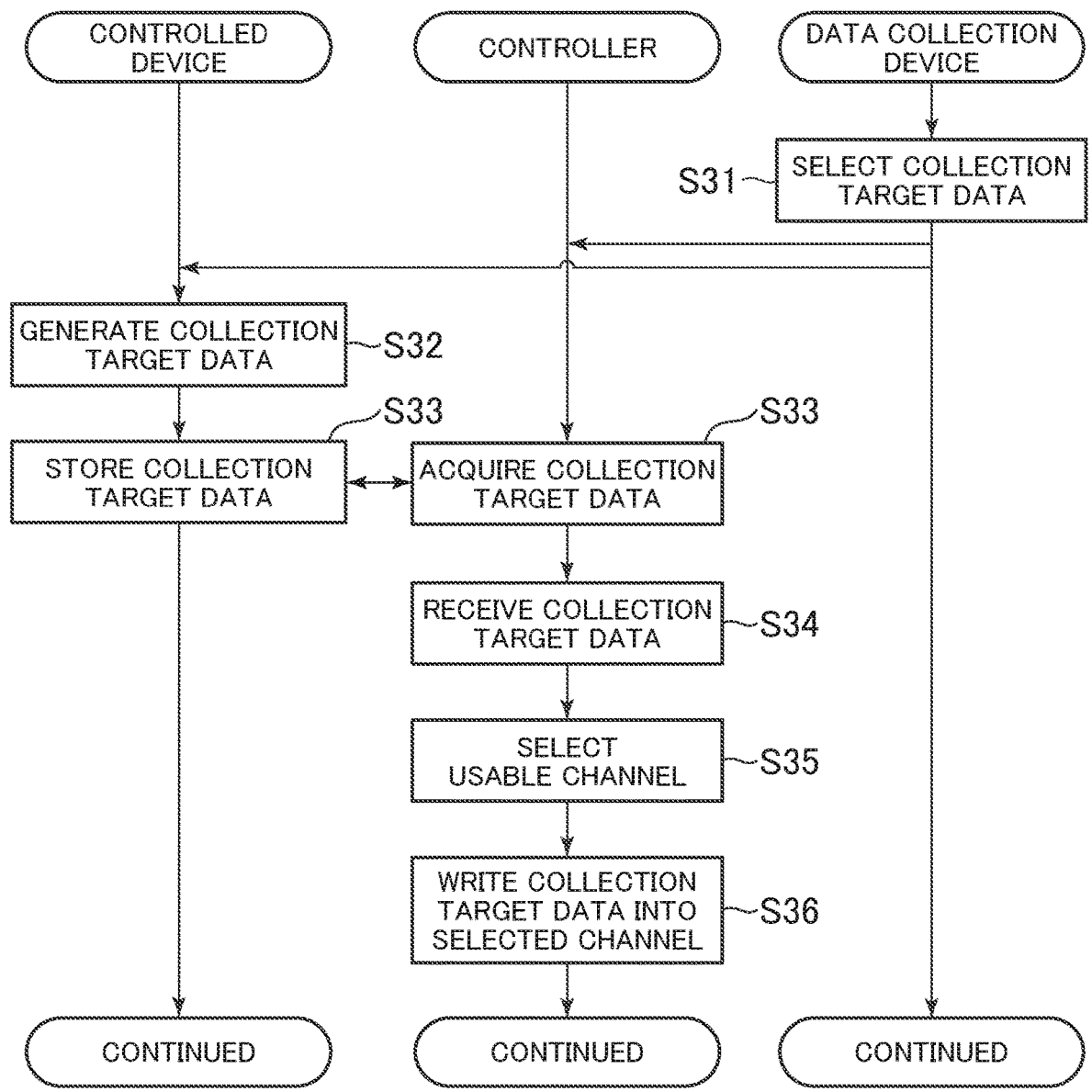
FIG. 8 is a flowchart for illustrating an example of processing to be executed in a production system according to a third embodiment of the present disclosure.

FIG. 8 is a flowchart for illustrating an example of processing to be executed in the production system 1 according to the third embodiment. In the third embodiment as well, a command for control is transmitted from the controller 20 to the controlled device 30, but is omitted in FIG. 8. As illustrated in FIG. 8, the processing of Step S31 and Step S32 is the same as the processing of Step S21 and Step S22, respectively. The controlled device 30 stores, in the storage 32, the collection target data generated irrespective of the command for control (without the command for control), and the controller 20 acquires the stored collection target data (Step S33).

In Step S33, the controlled device 30 accumulates the collection target data until an acquisition request is received from the controller 20 instead of generating and immediately transmitting the collection target data. In the third embodiment, it is assumed that the operation data is not included in the collection target data, but when a transmission timing of the collection target data happens to be simultaneous with a transmission timing of the operation data, the operation data may be included in the collection target data. The controller 20 executes an application for collecting the collection target data, and transmits an acquisition request for the collection target data to the controlled device 30 at any timing. When the controlled device 30 receives the acquisition request, the controlled device 30 transmits the stored collection target data to the controller 20. The following processing from Step S34 to Step S36 is the same as the processing from Step S24 to Step S26. After Step S34, the same processing as the processing of Step S9 and the subsequent steps is executed.

According to the second embodiment, the controlled device 30 is enabled to generate collection target data without a command for control from the controller 20.

7. Modification Examples

The present disclosure is not limited to the embodiments described above, and can be modified suitably without departing from the spirit of the present disclosure.

(1) For example, the controller 20 may utilize all or a part of the collection target data in controlling the controlled device 30 while transmitting the collection target data acquired from the controlled device 30 to the data collection device 10. In Modification Example (1) of the present disclosure, the controller 20 may specify a data structure of the collection target data, add a time stamp or other information to the collection target data, and then transmit the collection target data to the data collection device 10.

The acquisition module 204 in Modification Example (1) acquires the collection target data having a data structure defined in advance. The data structure refers to information indicating what is stored in which part of the collection target data. For example, the format, type, contents, or extension of the collection target data corresponds to an example of the data structure. It is assumed that the data structure of the collection target data is stored in the third data storage 202. For example, a definition of the data structure of the collection target data may be described in the control program or the application in the control program. The acquisition module 204 acquires the data structure stored in the third data storage 202.

The operation control module 203 controls the controlled device 30 through use of all or a part of the collection target data based on the data structure defined in advance. The operation control module 203 identifies the data structure of the collection target data acquired by the acquisition module 204 based on the data structure acquired by the acquisition module 204. The operation control module 203 controls the controlled device 30 through use of all or a part of the collection target data based on the identified data structure. The controlled device 30 is controlled based on the collection target data acquired from the controlled device 30, and hence this control can be referred to as "feedback."

It is assumed that a relationship between the collection target data and control contents is described in an application for feedback. The application for feedback may be a part of the control program, or may be a program provided separately from the control program. For example, the operation control module 203 inputs the identified data structure and all or a part of the collection target data into the application for feedback, and determines the control contents in the feedback. When an application is to be prepared for each data structure of the collection target data (for each type of collection target data), the operation control module 203 inputs the collection target data to the application corresponding to the identified data structure, and determines the control contents in the feedback.

For example, when the operation control module 203 identifies that the collection target data is data relating to the torque value based on the data structure defined in advance, the operation control module 203 inputs all or a part of the collection target data to an application for correcting an abnormality of the torque value. The application determines a correction amount of a command relating to a torque directed to the controlled device 30 based on the value of the input collection target data. In addition, for example, when the operation control module 203 identifies that the collection target data is data relating to the position of the motor based on the data structure defined in advance, the operation control module 203 inputs all or a part of the collection target data to an application for correcting an abnormality of the position of the motor. The application determines a correction amount of a command relating to the position of the motor with respect to the controlled device 30 based on the value of the input collection target data. Similarly for another data structure, the feedback corresponding to the identified data structure and the collection target data may be performed.

According to Modification Example (1), the collection target data is generated based on the data structure defined in advance, and the controlled device 30 is controlled through use of all or a part of the collection target data, to thereby be able to utilize the collection target data for controlling the controlled device 30 while transmitting the data to the data collection device 10. For example, the collection target data is immediately utilized for the control on the controller 20 side closer to the controlled device 30 to be controlled, to thereby be able to perform the feedback corresponding to the acquired collection target data more quickly than by causing the data collection device 10 to analyze the collection target data and feeding back the analysis result to the controlled device 30.

(2) Further, for example, the application on the controlled device 30 side may determine the collection target data without causing the controller 20 to identify the data structure of the collection target data. In this case, the application on the controller 20 transfers the collection target data to the data collection device 10 without identifying the data structure of the collection target data, and hence information for identifying which controlled device the collection target data is for may be added to the collection target data. The data structure of the collection target data is identified by the data collection device 10.

The data transmission module 213 adds the identification information relating to the controlled device 30 to the collection target data, and transmits, to the data collection device 10, the collection target data to which the identification information is added. The identification information may be any information that can uniquely identify the controlled device 30, and is, for example, a name, an IP address, an ID, or other information on the controlled device 30. In Modification Example (2) of the present disclosure, a case in which the identification information is stored in the third data storage 202 is described, but the identification information may be stored in another storage. For example, the command for control includes identification information on the controlled device 30 to which the command is to be transmitted. The data transmission module 213 adds this identification information to the collection target data acquired from the controlled device 30.

According to Modification Example (2), the collection target data to which the identification information relating to the controlled device 30 is added is transmitted, to thereby enable the controller 20 to identify which controlled device 30 the collection target data relating to the operation has been received for. As a result, for example, the operation of the controlled device 30 can be accurately analyzed.

Figure 9:
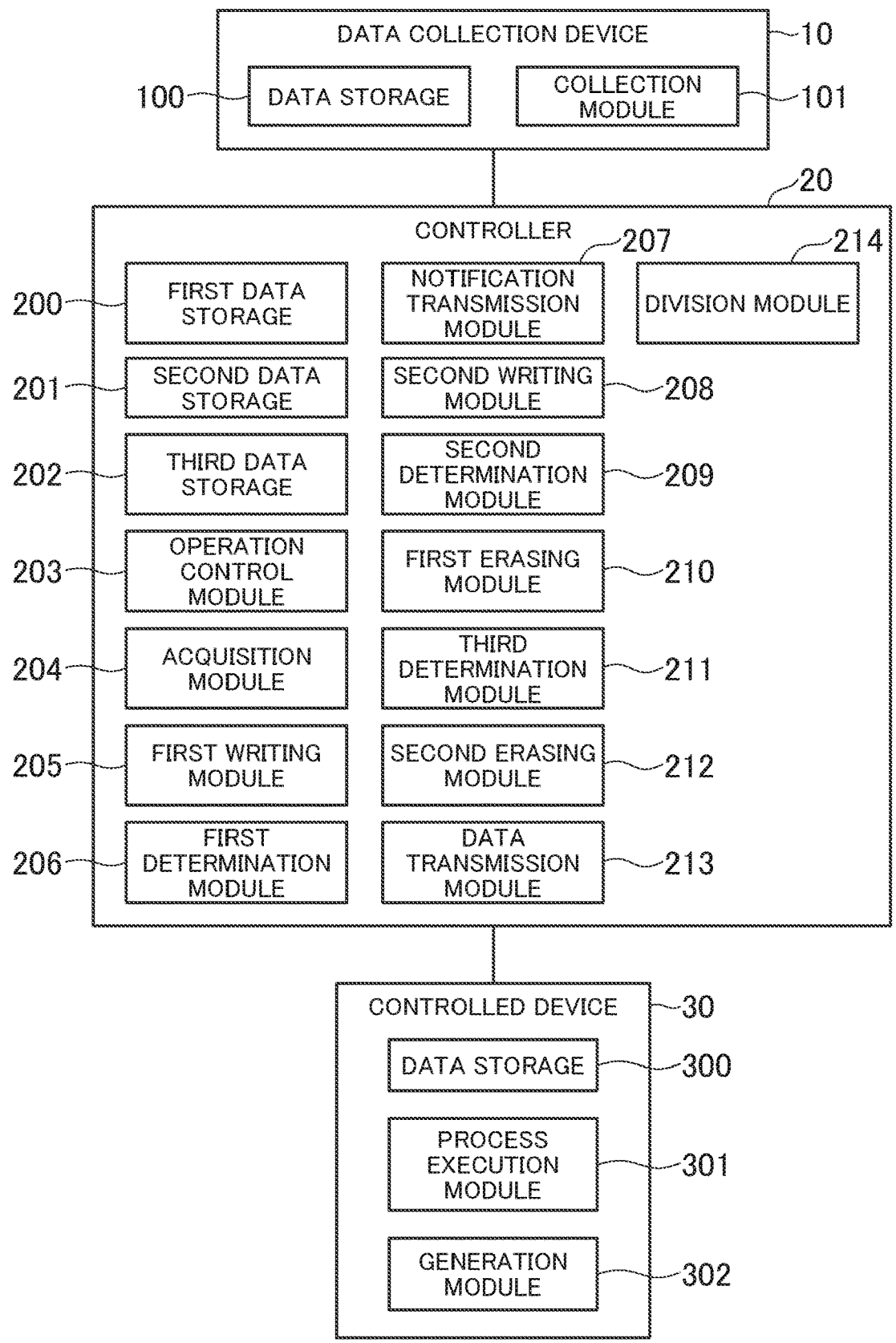
FIG. 9 is a functional block diagram in Modification Example (3) of the present disclosure.

(3) Further, for example, when the collection target data has a large size, the collection target data may be divided and written into a plurality of channels. FIG. 9 is a functional block diagram in Modification Example (3) of the present disclosure. As illustrated in FIG. 9, in Modification Example (3), in addition to the functions described in the embodiments, a division module 214 is implemented on the controller 20. The division module 214 is mainly implemented by the CPU 21. The division unit 214 is configured to divide the collection target data into a plurality of pieces of data. For example, the division unit 214 divides the collection target data into a plurality of pieces of data so that the size of each individual piece of data is equal to or smaller than the size of a channel. The sizes of the individual pieces of data obtained through the division of the collection target data may be equal to or different from one another.

The first writing module 205 writes the divided individual pieces of data into the asynchronous area. For example, the first writing module 205 writes the individual pieces of data into the asynchronous area by assigning the individual pieces of data to channels different from one another. It may be freely set which data is to be written into which channel. For example, individual pieces of data are stored in channels so that an order of the pieces of data in the collection target data matches an order of the channels.

The data transmission module 213 transmits the individual pieces of data written in the asynchronous area to the data collection device 10. The data transmission module 213 may combine the divided individual pieces of data into one and then transmit the data, or may transmit the individual pieces of data in a divided state. When the data is transmitted in the divided state, the data is combined on the data collection device 10 side. It is assumed that information for identifying that the data belongs to the same collection target data is added to the individual pieces of data when the individual pieces of data in the divided state are sequentially transmitted by the data transmission module 213 and combined on the data collection device 10 side. The data collection device 10 combines the individual pieces of data based on this information, to thereby acquire the collection target data.

According to Modification Example (3), the collection target data can be efficiently transmitted by dividing the collection target data into a plurality of pieces of data, writing the divided individual pieces of data into the asynchronous area, and transmitting the individual pieces of data written in the asynchronous area.

(4) Further, for example, the above-mentioned modification examples may be combined.

Further, for example, in the embodiments, the case in which the collection target data is the data relating to the operation of the controlled device 30 has been described, but the collection target data may be the data relating to the operation of the controller 20. In this case, the generation module 302 is implemented by the CPU 21 of the controller 20. The generation module 302 generates collection target data relating to the operation of the controller 20 based on a detection signal from the sensor connected to the controller 20 and internal information of the controller 20. A flow of processing in which the collection target data is transmitted to the data collection device 10 is as described in the embodiments. Further, for example, in the first embodiment, the case in which the collection target data is generated and transmitted based on the command for control has been described, but the collection target data may be generated and transmitted based on a command for collection separately from the command for control.

Further, for example, when the writing of the collection target data from the asynchronous area into the buffer area is completed, the collection target data written in the asynchronous area is not particularly required to be erased. In this case, it suffices that, when new collection target data is acquired, the transmitted collection target data stored in the asynchronous area is overwritten. Further, for example, when the transmission of the collection target data to the data collection device 10 is completed, the collection target data written in the buffer area is not particularly required to be erased. In this case, it suffices that, when new collection target data is acquired, the transmitted collection target data stored in the buffer area is overwritten.

Further, for example, each of the functions described above may be implemented by any device included in the production system 1. For example, the function described as being implemented by the data collection device 10 may be implemented by the controller 20 or the controlled device 30. Further, for example, the function described as being implemented by the controller 20 may be implemented by the data collection device 10 or the controlled device 30. Further, for example, each of the functions may be implemented by one computer instead of being shared by a plurality of computers.

Further, the embodiments described above are given as specific examples, and are not to limit the invention disclosed herein to the very configurations and data storage examples of the specific examples. A person skilled in the art may make various modifications to the disclosed embodiments with regard to, for example, the shapes and numbers of physical components, data structures, and execution orders of processing. It is to be understood that the technical scope of the invention disclosed herein encompasses such modifications.

What is claimed is:

1. A production system, comprising:
   a first industrial machine configured to control a second industrial machine; and circuitry configured to acquire data relating to an operation of at least one of the first industrial machine or the second industrial machine,
wherein the first industrial machine comprises a synchronous area regularly subjected to synchronization and an asynchronous area different from the synchronous area, and
wherein the first industrial machine is configured to:
write the data into the asynchronous area;
transmit the data written in the asynchronous area to an external device,
determine whether the writing of the data is completed;
transmit a predetermined notification to the external device when it is determined that the writing of the data is completed,
wherein the external device is configured to transmit a predetermined request to the first industrial machine when the external device receives the predetermined notification, and
wherein the first industrial machine is configured to transmit the data to the external device when the predetermined request is received.

2. The production system according to claim 1, wherein the first industrial machine includes:
a first control circuit configured to control the second industrial machine, acquire the data, and write the data; and
a second control circuit including the asynchronous area and configured to transmit the data, and
wherein the first control circuit is configured to write the data into the asynchronous area of the second control circuit.

3. The production system according to claim 2, wherein the asynchronous area includes a plurality of small areas relative to the asynchronous area,
wherein the first industrial machine is configured to:
write the data by selecting at least one small area which is usable from among the plurality of small areas, and
transmit the data written in the at least one small area to the external device.

4. The production system according to claim 2, the data written in the asynchronous area is written into a buffer area different from the synchronous area and the asynchronous area,
wherein the first industrial machine is configured to transmit the data written in the buffer area to the external device.

5. The production system according to claim 1, wherein the asynchronous area includes a plurality of small areas relative to the asynchronous area,
wherein the first industrial machine is configured to:
write the data by selecting at least one small area which is usable from among the plurality of small areas, and
transmit the data written in the at least one small area to the external device.

6. The production system according to claim 5, the data written in the asynchronous area is written into a buffer area different from the synchronous area and the asynchronous area,
wherein the first industrial machine is configured to transmit the data written in the buffer area to the external device.

7. The production system according to claim 1, the data written in the asynchronous area is written into a buffer area different from the synchronous area and the asynchronous area,
wherein the first industrial machine is configured to transmit the data written in the buffer area to the external device.

8. The production system according to claim 7, wherein the first industrial machine is configured to:
determine whether the writing of the data from the asynchronous area into the buffer area is completed; and
erase the data written in the asynchronous area when it is determined that the writing of the data from the asynchronous area into the buffer area is completed.

9. The production system according to claim 8, wherein the first industrial machine is configured to:
determine whether the transmission of the data to the external device is completed; and
erase the data written in the buffer area when it is determined that the transmission of the data to the external device is completed.

10. The production system according to claim 7, wherein the first industrial machine is configured to:
determine whether the transmission of the data to the external device is completed; and
erase the data written in the buffer area when it is determined that the transmission of the data to the external device is completed.

11. The production system according to claim 1,
wherein the circuitry is configured to acquire the data having a data structure defined in advance, and
wherein the first industrial machine is configured to control the second industrial machine through use of all or a part of the data based on the data structure defined in advance.

12. The production system according to claim 1,
wherein the data is data relating to the operation of the second industrial machine, and
wherein the first industrial machine is configured to add identification information relating to the second industrial machine to the data, and transmit, to the external device, the data to which the identification information is added.

13. The production system according to claim 1, wherein the first industrial machine is configured to:
divide the data into a plurality of pieces of data,
write individual pieces of data obtained through the division into the asynchronous area, and
transmit, to the external device, the individual pieces of data written in the asynchronous area.

14. The production system according to claim 1,
wherein the first industrial machine includes:
a first control circuit configured to control the second industrial machine, acquire the data, and write the data; and
a second control circuit including the asynchronous area and configured to transmit the data, and
wherein the first control circuit is configured to write the data into the asynchronous area of the second control circuit.

15. The production system according to claim 1,
wherein the asynchronous area includes a plurality of small areas relative to the asynchronous area,
wherein the first industrial machine is configured to:

write the data by selecting at least one small area which is usable from among the plurality of small areas, and transmit the data written in the at least one small area to the external device.

16. The production system according to claim 1, the data written in the asynchronous area is written into a buffer area different from the synchronous area and the asynchronous area, wherein the first industrial machine is configured to transmit the data written in the buffer area to the external device.

17. The production system according to claim 1, wherein the circuitry is configured to acquire the data having a data structure defined in advance, and wherein the first industrial machine is configured to control the second industrial machine through use of all or a part of the data based on the data structure defined in advance.

18. A data transmission method, comprising:

acquiring data relating to an operation of at least one of a first industrial machine configured to control a second industrial machine or the second industrial machine, the first industrial machine comprising a synchronous area regularly subjected to synchronization and an asynchronous area different from the synchronous area;

writing the data into the asynchronous area;

transmitting the data written in the asynchronous area to an external device determining whether the writing of the data is completed;

transmitting a predetermined notification to the external device when it is determined that the writing of the data is completed, wherein the external device is configured to transmit a predetermined request to the first industrial machine when the external device receives the predetermined notification, and wherein the first industrial machine is configured to transmit the data to the external device when the predetermined request is received.

19. A non-transitory computer readable information storage medium storing a program for causing a first industrial machine configured to:

control a second industrial machine, the first industrial machine comprising a synchronous area regularly subjected to synchronization and an asynchronous area different from the synchronous area, to transmit, to an external device, data relating to an operation of at least one of the first industrial machine or the second industrial machine, the data being written in the asynchronous area, determine whether writing of the data is completed;

transmit a predetermined notification to the external device when it is determined that the writing of the data is completed, wherein the external device is configured to transmit a predetermined request to the first industrial machine when the external device receives the predetermined notification, and wherein the first industrial machine is configured to transmit the data to the external device when the predetermined request is received.

\* \* \* \* \*